United States Patent
Yu (10) Patent No.: US 8,699,223 B2
(45) Date of Patent: Apr. 15, 2014

(54) TWO-WAY LATCH MECHANISM AND RELATED ELECTRONIC DEVICE

(75) Inventor: Ching-Jeng Yu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 39 days.

(21) Appl. No.: 13/441,943

(22) Filed: Apr. 9, 2012

(65) Prior Publication Data

US 2012/0262856 A1 Oct. 18, 2012

(30) Foreign Application Priority Data

Apr. 12, 2011 (TW) .............................. 100112708 A (51) Int. Cl.
*H05K 5/00* (2006.01)
*H05K 7/00* (2006.01)
*G06F 1/16* (2006.01)
*E05C 17/56* (2006.01)
*E05C 19/16* (2006.01)

(52) U.S. Cl.
USPC ............ 361/679.58; 361/679.26; 361/679.55; 292/251.5

(58) Field of Classification Search
USPC ......... 361/679.26, 679.55, 679.58; 292/251.5
See application file for complete search history.

(56) References Cited

U.S. PATENT DOCUMENTS

| | | | | |
|---|---|---|---|---|
| 6,517,129 B1* | 2/2003 | Chien et al. | ................. | 292/251.5 |
| 7,261,331 B2* | 8/2007 | Lin | ................. | 292/116 |
| 7,637,540 B2* | 12/2009 | Chiang | ........................ | 292/45 |
| 7,997,631 B2* | 8/2011 | Chen | ......................... | 292/251.5 |
| 8,355,250 B2* | 1/2013 | Yu | ............................ | 361/679.58 |
| 2011/0026197 A1* | 2/2011 | Zhao et al. | ............... | 361/679.01 |

FOREIGN PATENT DOCUMENTS

TW 530980 5/2003

OTHER PUBLICATIONS

Office action mailed on Nov. 18, 2013 for the Taiwan application No. 100112708, filing date: Apr. 12, 2011, p. 1 line 12-14, p. 2 line 1-10 and line 12-24, p. 3 line 3-26, p. 4 line 1-10 and line 12-24 and p. 5 line 3-21.
Office action mailed on Jan. 8, 2014 for the China application No. 201110101501.5, p. 3 line 4-32.

* cited by examiner

*Primary Examiner* — Anthony Haughton
(74) *Attorney, Agent, or Firm* — Winston Hsu; Scott Margo (57) ABSTRACT

A two-way latch mechanism includes a hook disposed inside a host for engaging with a first hole on a panel and for engaging with a second hole on the panel after the panel rotates relative to the host at 180 degrees. The two-way latch mechanism further includes an actuating component. Two pushing portions are respectively disposed on two sides of the actuating component. One of the pushing portions slides at a first direction for separating the hook from the first hole, and the other slides at the first direction for separating the hook from the second hole. The two-way latch mechanism further includes two elastic components for respectively providing elastic forces on the actuating component, so as to hold the actuating component at a predetermined position stably.

18 Claims, 11 Drawing Sheets

TWO-WAY LATCH MECHANISM AND RELATED ELECTRONIC DEVICE

BACKGROUND OF THE INVENTION

1. Field of the Invention

The present disclosure relates to a latch mechanism for latching a panel and a host of a portable computer, and more particularly, to a two-way latch mechanism for latching a panel and a host of a portable computer and a related electronic device.

2. Description of the Prior Art

Generally speaking, when a notebook computer is close, a latch mechanism is used for latching a monitor and a host in order to fix the monitor and the host. For example, a conventional latch mechanism often utilizes a link set with a pin to latch the monitor and the host. However, a movable component in the prior art is often disposed on the host, and a fixing component, such as the pin, is disposed on the monitor, so as to perform locking and releasing function by means of cooperation of the movable component and the fixing component. In such a manner, the conventional latching mechanism is more complicated, and needs more mechanical space occupied by other mechanical components of the host, such as a speaker. Unfortunately, there are more components disposed in the host, so the mechanical space in the host is more valuable than that in the monitor. Moreover, a monitor of a convertible computer designed for handwriting function can be rotated by 180 degrees. When presenting to customers, the monitor can be rotated to an adequate orientation for the customers to watch contents of the presentation. Or when discussing with colleagues, it achieves two-way communication. Furthermore, the convertible computer simultaneously has a notebook computer mode and a tablet computer mode. That is, when the monitor is rotated by 180 degrees and combined with the host, the convertible computer can be used as a tablet computer. However, the conventional latch mechanism for the convertible computer has not been developed to be capable of two-way latching the host, that is, a design for latch mechanism of the convertible computer based on two modes has not been developed. Thus, the conventional portable computer has important issues of the latch mechanism for two-way latching.

SUMMARY OF THE INVENTION

The present disclosure provides a two-way latch mechanism for latching a panel and a host of a portable computer and a related electronic device for solving above drawbacks.

According to the claimed disclosure, a two-way latch mechanism includes a hook pivotally disposed inside a host for engaging with a first hole on a panel when the panel is located at a first position relative to the host and for engaging with a second hole on the panel after the panel rotates at 180 degrees from the first portion to a second position relative to the host. The two-way latch mechanism further includes an actuating component slidably disposed inside the panel. Two pushing portions are respectively formed on two sides of the actuating component. One of the pushing portions slides at a first direction for separating the hook from the first hole when the panel is located at the first position relative to the host, and the other pushing portion slides at the first direction for separating the hook from the second hole when the panel is located at the second position relative to the host. The two-way latch mechanism further includes two resilient components respectively disposed on two ends of the actuating component and installed inside the panel for providing resilient recovering force to the actuating component, so as to hold the actuating component at a predetermined position.

According to the claimed disclosure, the two-way latch mechanism further includes two positioning components respectively slidably disposed on two ends of the actuating component and inside the panel. A sliding slot and a constraining slot are formed on each positioning component, and the constraining slot being connected to the sliding slot. The two-way latch mechanism further includes a constraining component slidably disposed inside the panel. Two misaligning protrusions are formed on two ends of the constraining component. One of the protrusions is disposed inside the sliding slot on one of the positioning components, and the other protrusion is disposed inside the constraining slot on the other positioning component.

According to the claimed disclosure, the two-way latch mechanism further includes at least one protruding rib, the constraining component slidably sheathing on the protruding rib.

According to the claimed disclosure, the two-way latch mechanism further includes a magnetic component disposed inside the host for sliding the protrusions on the constraining component between the sliding slot and the constraining slot on the positioning component.

According to the claimed disclosure, the two-way latch mechanism further includes two buffers respectively disposed between the corresponding positioning component and the actuating component.

According to the claimed disclosure, the two-way latch mechanism further includes a plurality of ribs, and the positioning component slides relative to the plurality of ribs.

According to the claimed disclosure, the two-way latch mechanism further includes a first driving component connected to the hook for driving the hook into the host.

According to the claimed disclosure, the two-way latch mechanism further includes a second driving component disposed on the actuating component and located at a position corresponding to the hook for protruding the hook from the host when the panel is located at the first position and the second position relative to the host, so as to engage with the panel.

According to the claimed disclosure, the first driving component is a torsional spring, and the second driving component is a magnet.

According to the claimed disclosure, the two-way latch mechanism further includes a button connected to the actuating component.

According to the claimed disclosure, an electronic device includes a host, and a panel pivoted to the host. A first hole and a second hole are formed on the panel. The electronic device further includes a two-way latch mechanism for constraining relative movement between the host and the panel. The two-way latch mechanism includes a hook pivotally disposed inside a host for engaging with a first hole on a panel when the panel is located at a first position relative to the host and for engaging with a second hole on the panel after the panel rotates at 180 degrees from the first portion to a second position relative to the host. The two-way latch mechanism further includes an actuating component slidably disposed inside the panel. Two pushing portions are respectively formed on two sides of the actuating component. One of the pushing portions slides at a first direction for separating the hook from the first hole when the panel is located at the first position relative to the host, and the other pushing portion slides at the first direction for separating the hook from the second hole when the panel is located at the second position relative to the host. The two-way latch mechanism further includes two resilient components respectively disposed on two ends of the actuating component and installed inside the panel for providing resilient recovering force to the actuating component, so as to hold the actuating component at a predetermined position.

The button of the two-way latch mechanism of the present disclosure is disposed on the panel. The two-way latch mechanism of the present disclosure has functions of dual directional lock, so that the panel can cover the host in two opposite directions. The two-way latch mechanism of the present disclosure can constrain relative pivot of the panel relative to the host. In addition, the button of the two-way latch mechanism of the present disclosure can keep at the middle position and is unable to move at an unexpected direction, so as to increase operational convenience.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
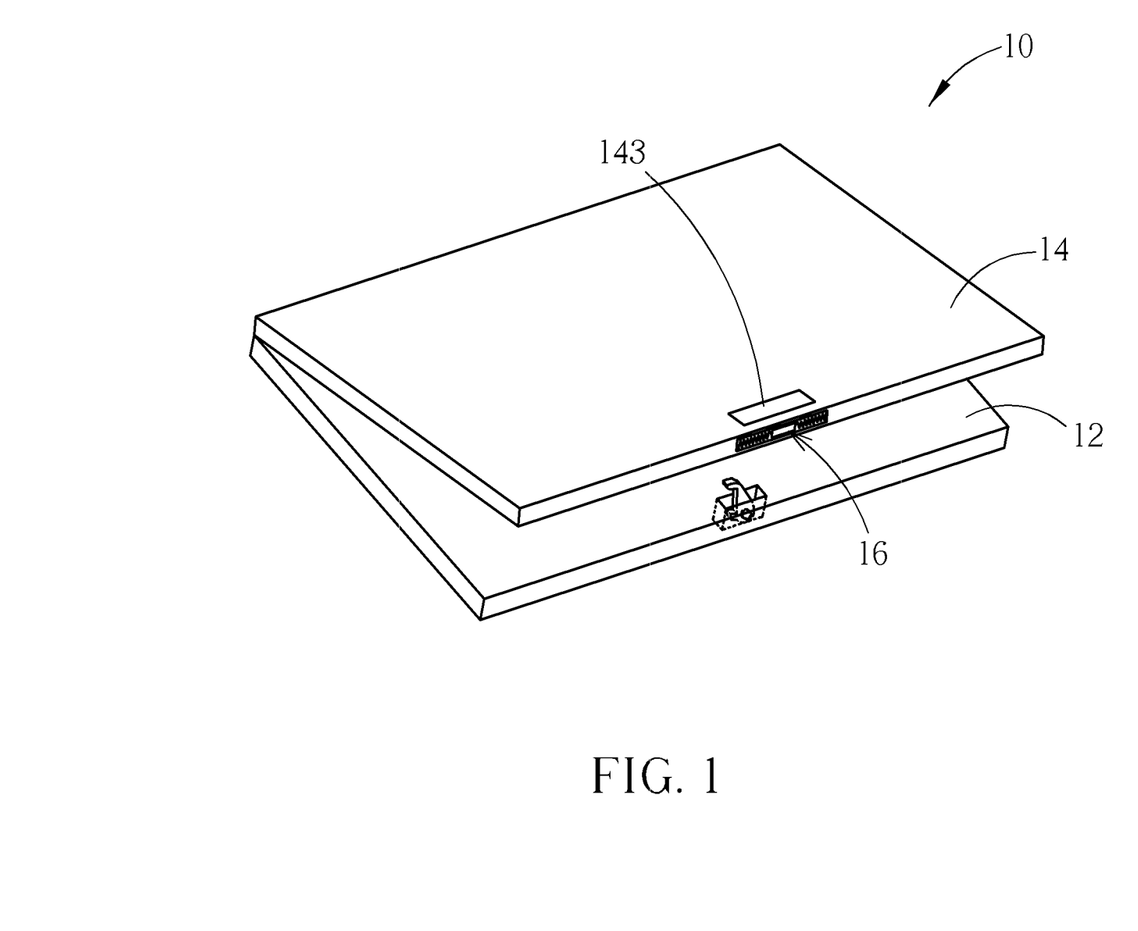
FIG. 1 to FIG. 3 are diagrams of an electronic device in different modes according to an embodiment of the present disclosure.
Figure 2:
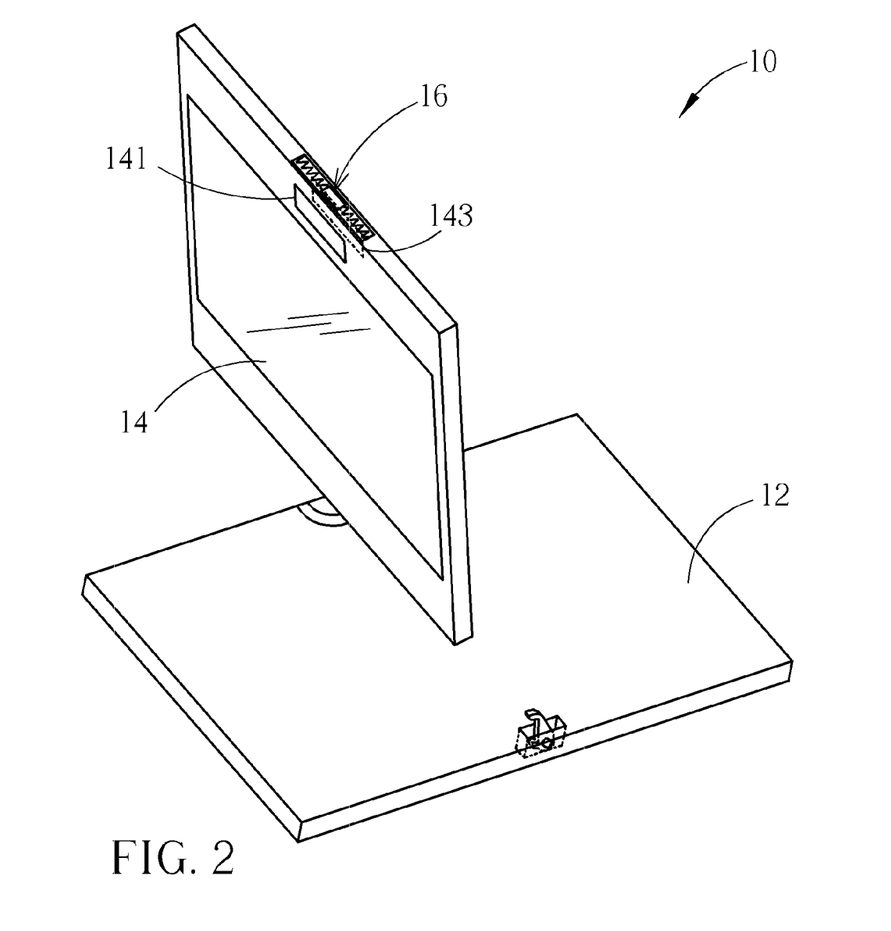
Figure 3:
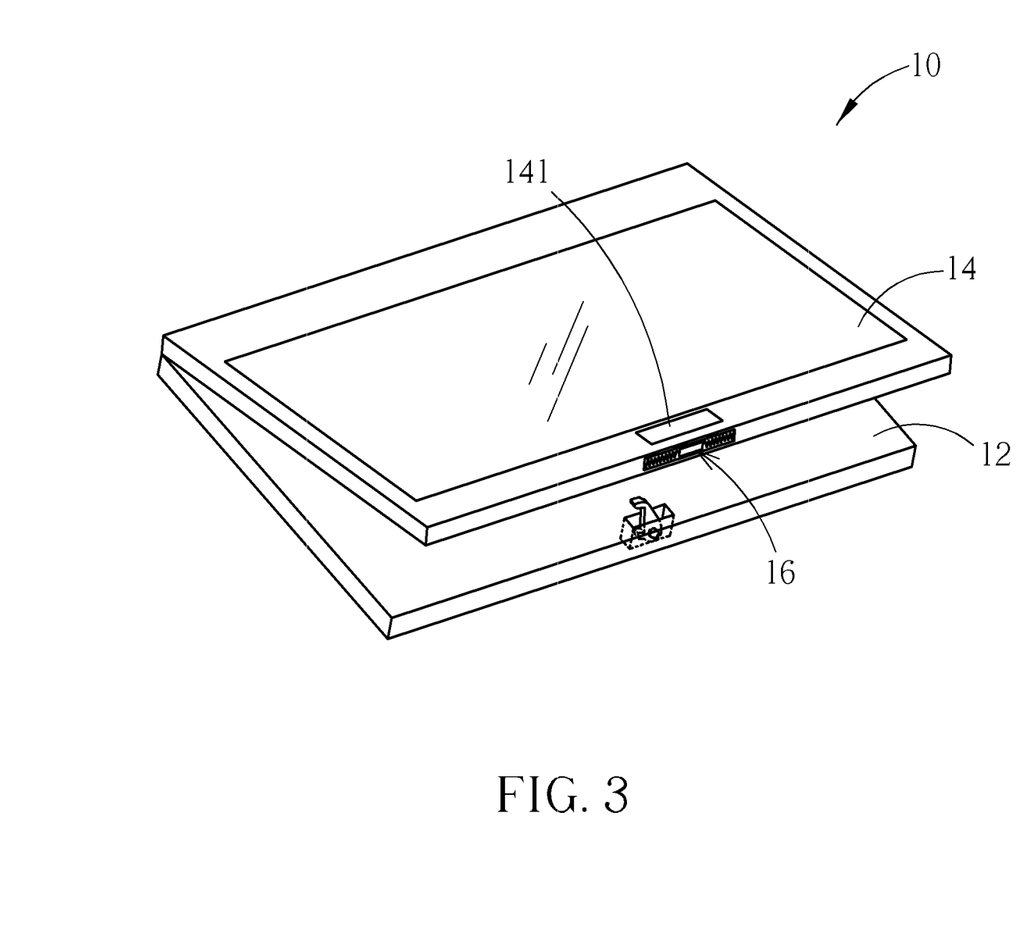

Please refer to FIG. 1, FIG. 2 and FIG. 3. FIG. 1 to FIG. 3 are diagrams of an electronic device 10 in different modes according to an embodiment of the present disclosure. The electronic device 10 can be a notebook computer, such as a notebook computer with a reversible display panel. The electronic device 10 can be switched between the notebook computer mode and the tablet computer mode according to user demand. The electronic device 10 includes a host 12, and a panel 14 pivoted to the host 12. The panel 14 can be rotated relative to the host 12 at 180 degrees, so as to adjust a view angle of the panel 14. The panel 14 includes a first hole 141 and the second hole 143, which are respectively formed on two surfaces of the panel 14. The electronic device 10 further includes a two-way latch mechanism 16 for buckling into the first hole 141 or the second hole 143 according to a rotary angle of the panel 14 relative to the host 12, so as to constrain relative movement between the host 12 and the panel 14.

Figure 4:
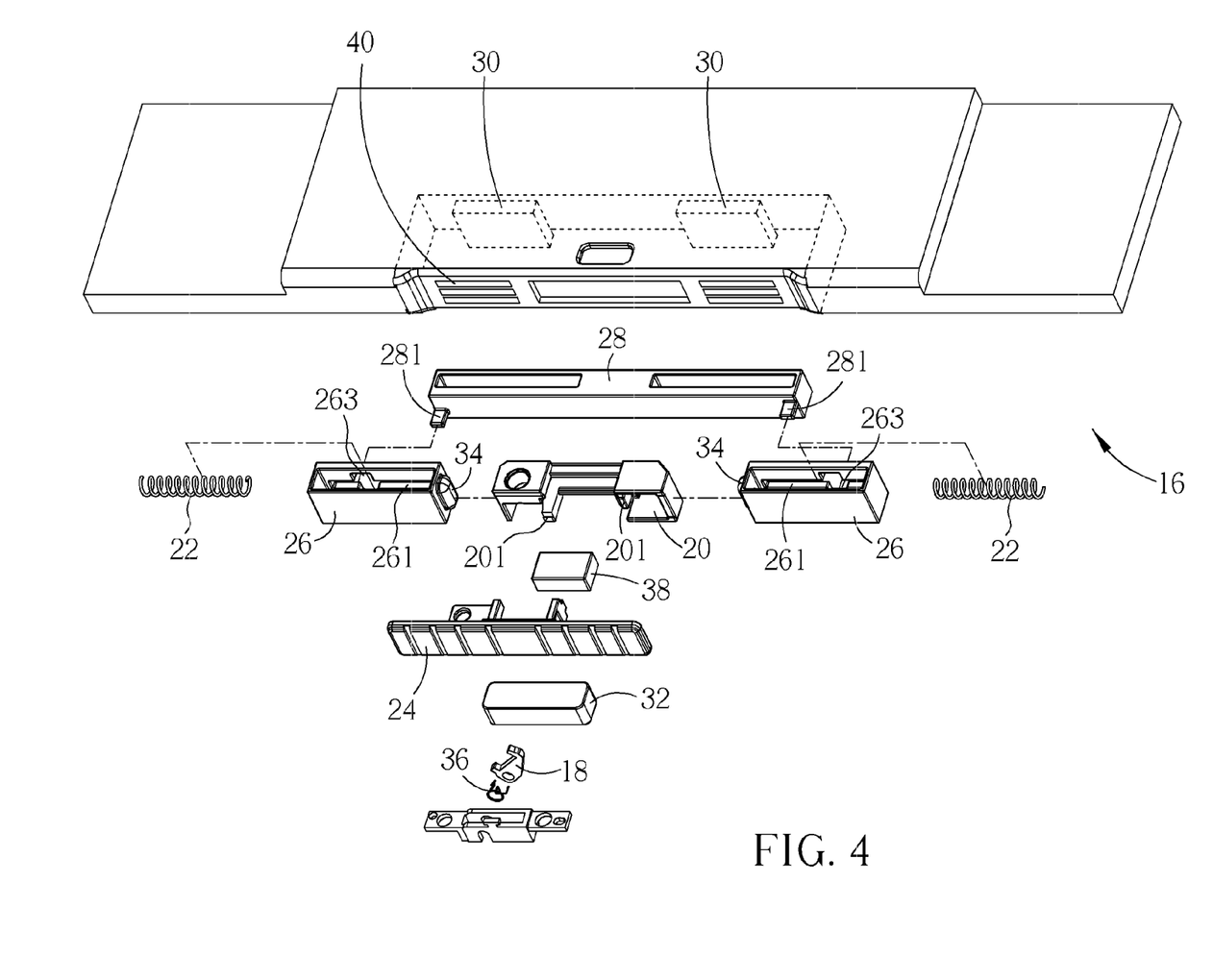
FIG. 4 is an exploded diagram of a two-way latch mechanism according to the embodiment of the present disclosure.
Figure 5:
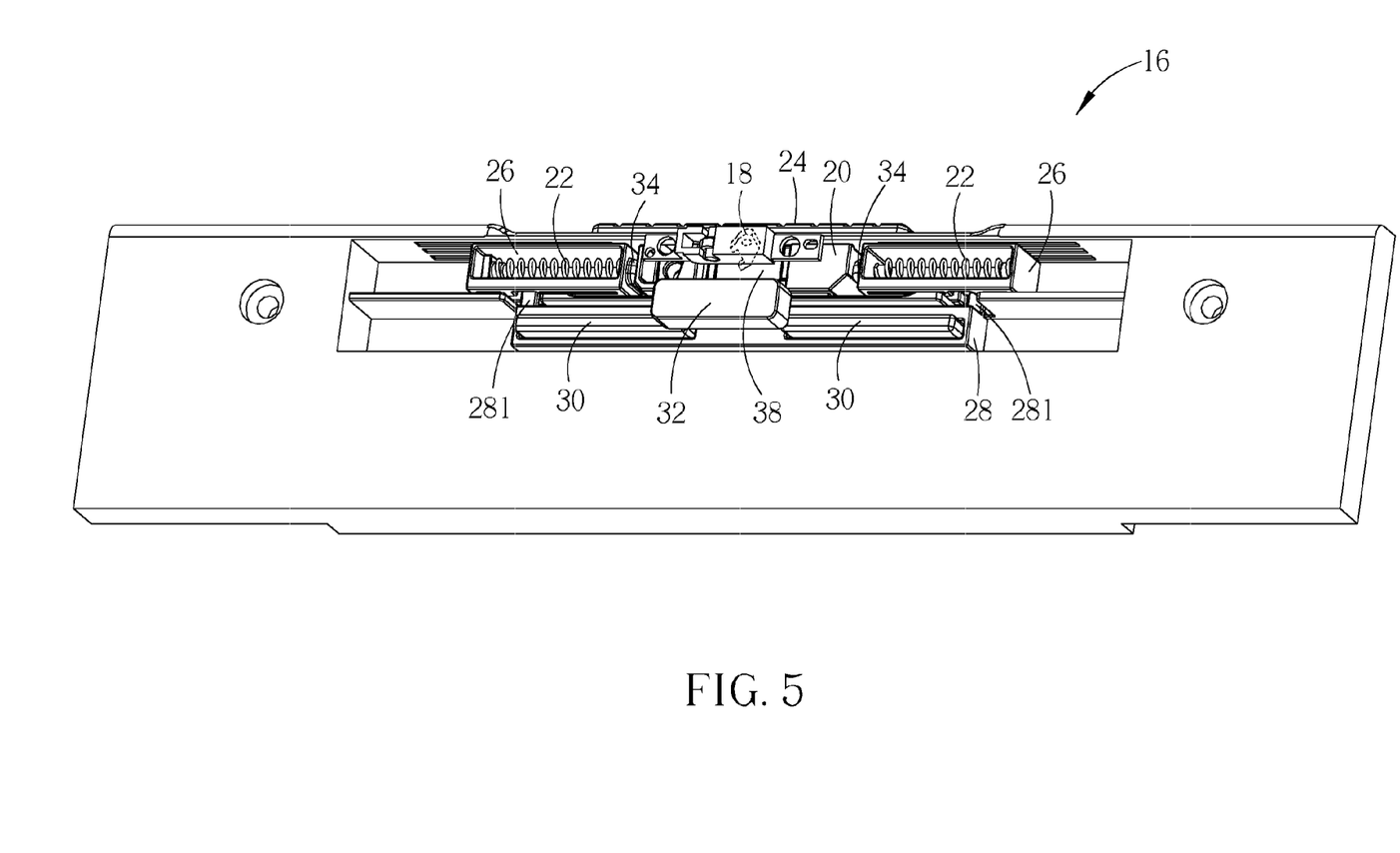
FIG. 5 and FIG. 6 are diagrams presenting different views of the two-way latch mechanism according to the embodiment of the present disclosure.
Figure 6:
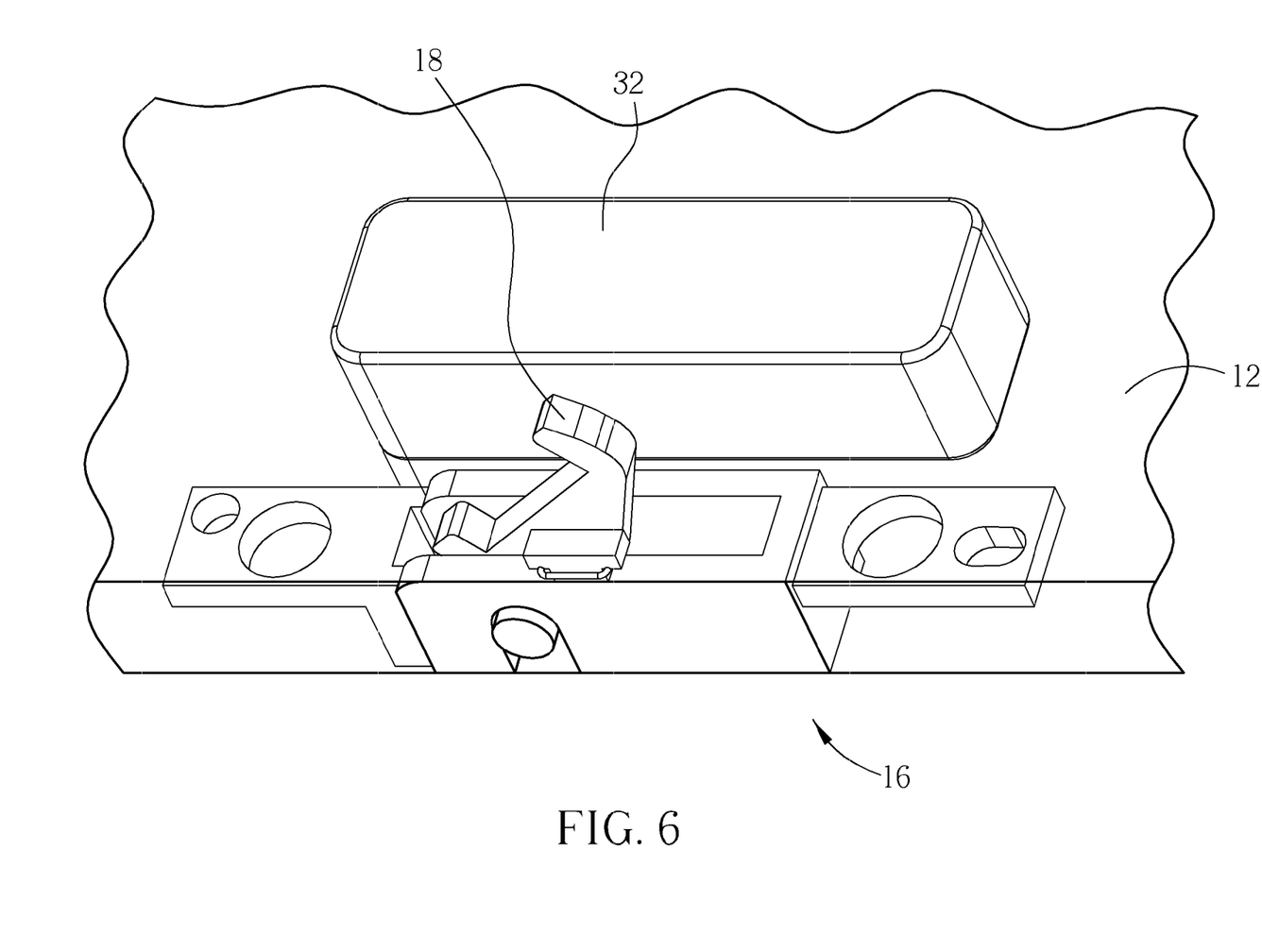

Please refer to FIG. 4, FIG. 5 and FIG. 6. FIG. 4 is an exploded diagram of the two-way latch mechanism 16 according to the embodiment of the present disclosure. FIG. 5 and FIG. 6 are diagrams presenting different views of the two-way latch mechanism 16 according to the embodiment of the present disclosure. The two-way latch mechanism 16 includes a hook 18 pivotally disposed on the host 12 for buckling into the first hole 141 or the second hole 143. The two-way latch mechanism 16 further includes an actuating component 20 slidably disposed on the panel 14. Two pushing portions 201 are respectively formed on two surfaces of the actuating component 20 for separating the hook 18 from the first hole 141 or the second hole 143. The two-way latch mechanism 16 further includes two resilient components 22 respectively disposed on two ends of the actuating component 20 and installed inside the panel 14 for providing resilient recovering force to the actuating component 20, so as to stably fix the actuating component 20 at a predetermined position, such as an initial middle position. The two-way latch mechanism 16 can further include a button 24 connected to the actuating component 20. The button 24 can be pushed for driving the actuating component 20 to move the hook 18.

In addition, the two-way latch mechanism 16 can further include two positioning components 26 slidably disposed on two ends of the actuating component 20 and installed inside the panel 14, respectively. A sliding slot 261 and a constraining slot 263 are respectively formed on each positioning component 26, and the constraining slot 263 is communicated with the sliding slot 261. The two-way latch mechanism 16 can further include a constraining component 28 slidably disposed inside the panel 14. Two misaligning protrusions 281 are respectively formed on two ends of the constraining component 28. One of the protrusions 281 is disposed inside the sliding slot 261 on one of the positioning components 26, and the other protrusion 281 is disposed inside the constraining slot 263 on the other positioning component 26. The two-way latch mechanism 16 can further include at least one protruding rib 30, and the constraining component 28 can be slidably disposed on the protruding rib 30, so that the protrusion 281 on the constraining component 28 can slide between the sliding slot 261 and the constraining slot 263 on the positioning component 26 by moving the constraining component 28 relative to the protruding rib 30.

Furthermore, the two-way latch mechanism 16 can further include a magnetic component 32 disposed inside the host 12 for sliding the constraining component 28 relative to the protruding rib 30, which means that the magnetic component 32 can slide the protrusion 281 between the sliding slot 261 and the constraining slot 263. The two-way latch mechanism 16 can further include two buffers 34 respectively disposed between the corresponding positioning component 26 and the actuating component 20 for absorbing vibration of the actuating component 20 as contacting the positioning component 26. The two-way latch mechanism 16 can further include a first driving component 36 connected to the hook 18, and a second driving component 38 disposed on the actuating component 20 and located at a position corresponding to the hook 18. The first driving component 36 is for driving the hook 18 into the host 12. For example, the first driving component 36 can be a torsional spring, and is designed according to actual demand. The second driving component 38 is for protruding the hook 18 from the host 12 when the panel 14 is located at a first position as shown in FIG. 1 or at a second position as shown in FIG. 3 relative to the host 12, so that the hook 18 can be buckled into the panel 14. For example, the hook 18 and the second driving component 38 can be made of magnetic material. Material and structures of the first driving component 36 and the second driving component 38 are not limited to the above embodiment, and depend on design demand.

When the panel 14 is close to the host 12 and located at the first position as shown in FIG. 1 (or the second position as shown in FIG. 3), magnetic force between the second driving component 38 and the hook 18 is substantially greater than driving force of the first driving component 36 applied on the hook 18 for accommodating the hook 18 inside the host 12, so that the hook 18 protrudes from the host 12 for buckling into the panel 14. For increasing operating efficiency of the two-way latch mechanism 16, the two-way latch mechanism 16 can further include a plurality of ribs 40, and the positioning component 26 can slide along the plurality of ribs 40, so as to decrease contacting area between the positioning component 26 and a wall whereon the ribs 40 are formed for increasing sliding stability of the positioning component 26.

Figure 7:
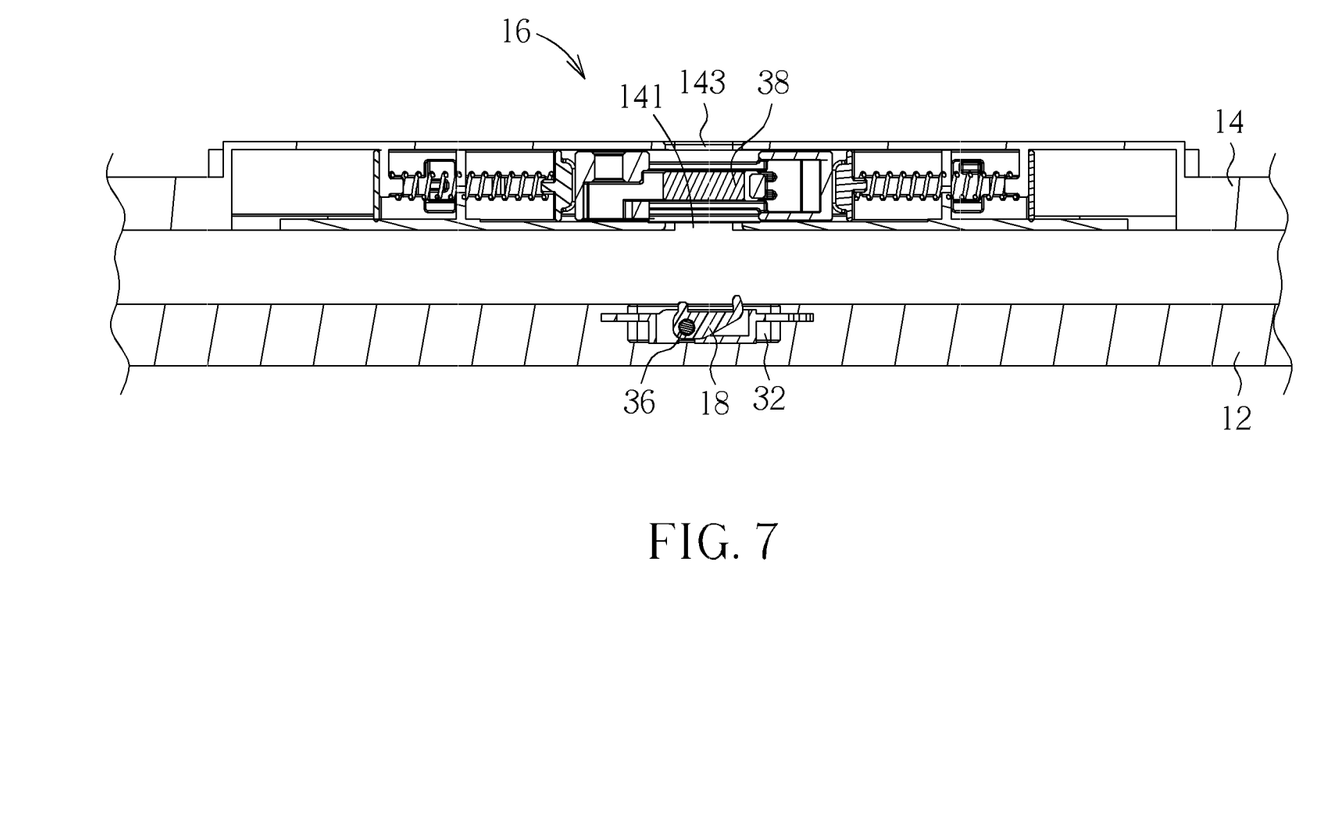
FIG. 7 and FIG. 8 are diagrams of the two-way latch mechanism in different operating modes according to the embodiment of the present disclosure.
Figure 8:
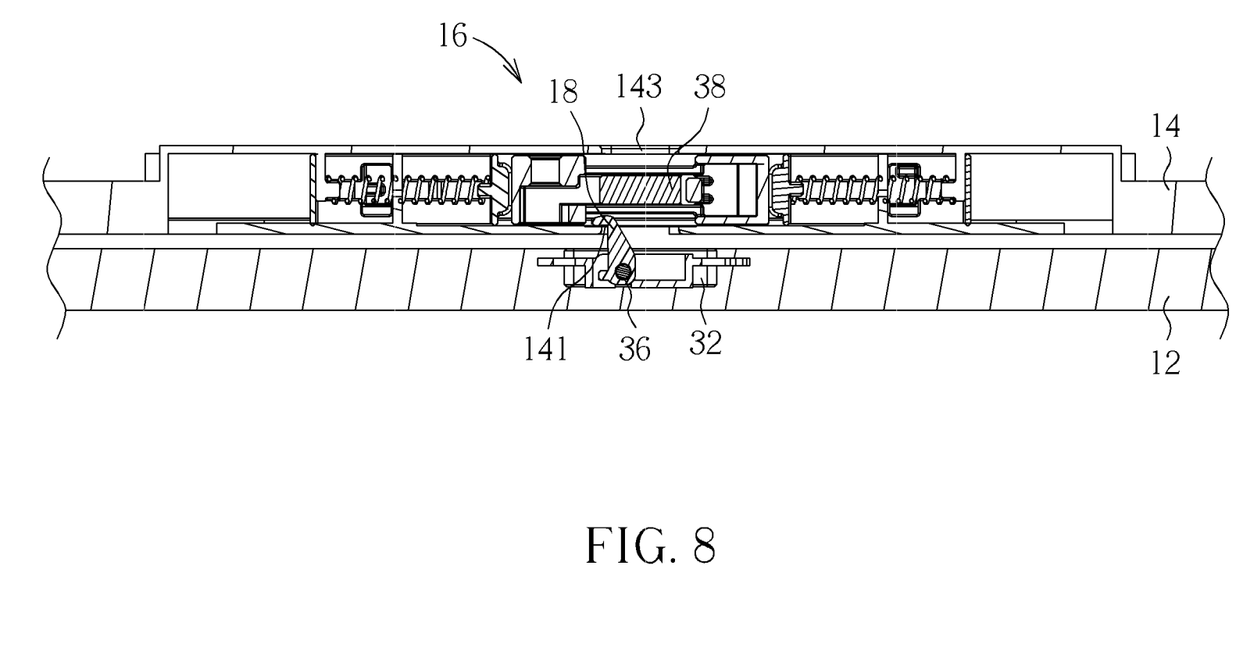

Please refer to FIG. 7 and FIG. 8. FIG. 7 and FIG. 8 are diagrams of the two-way latch mechanism 16 in different operating modes according to the embodiment of the present disclosure. As shown in FIG. 7, the hook 18 is accommodated inside the host 12 by the first driving component 36 when the panel 14 is not close to the host 12. Then, as shown in FIG. 8, when the panel 14 is close to the host 12, which means that the panel 14 is located at the first position relative to the host 12 as shown in FIG. 1, the hook 18 protrudes from the host 12 and buckles into the first hole 141 on the panel 14 by the second driving component 38, so as to constrain the relative movement between the host 12 and the panel 14. In addition, when the panel 14 rotates relative to the host 12 at 180 degrees, so as to switch from the first position to the second position, which means that the second hole 143 on the panel 14 is close to the host 12, the hook 18 can protrude from the host 12 and buckle into the second hole 143 on the panel 14 by the second driving component 38, so that the panel 14 can not rotate relative to the host 12.

Figure 9:
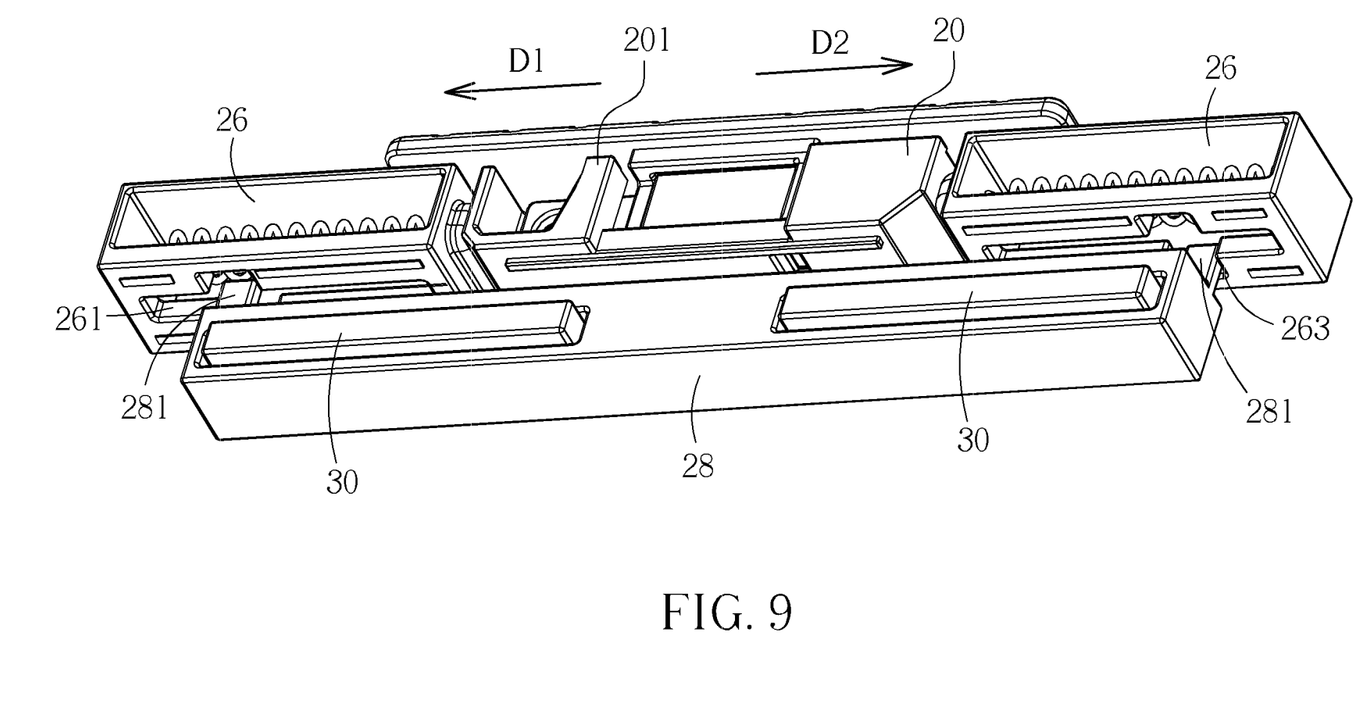
FIG. 9 is a diagram of a positioning component and a constraining component according to the embodiment of the present disclosure.

Please refer to FIG. 7 to FIG. 9. FIG. 9 is a diagram of the positioning component 26 and the constraining component 28 according to the embodiment of the present disclosure. As shown in FIG. 9, when the panel 14 is located at the first position relative to the host 12, the protrusion 281 on the constraining component 28 (the left side one) which a first direction D1 points is located inside the sliding slot 261 on the corresponding positioning component 26, and the other protrusion 281 on the constraining component 28 (the right side one) which a second direction D2, opposite to the first direction D1, points is located inside the constraining slot 263 on the corresponding positioning component 26. Thus the right positioning component 26 can be for preventing the actuating component 20 from sliding at the second direction D2, and the left positioning component 26 can slide along the first direction D1 by the actuating component 20, which means that the positioning component 26 only slides relative to the constraining component 28 along the first direction D1, so that the corresponding pushing portion 201 of the actuating component 20 can be for pushing the hook 18, so as to separate the hook 18 from the first hole 141. It should be mentioned that the constraining component 28 can slide relative to the protruding rib 30 by the magnetic component 32 when the panel 14 rotates relative to the host 12 at 180 degrees and is located at the second position. Because the actuating component 20, the positioning component 26 and the constraining component 28 are symmetric components, the relative position of the positioning component 26 and the constraining component 28 is located as shown in FIG. 9, which means the positioning component 26 only slides relative to the constraining component 28 along the first direction D1, so that the corresponding pushing portion 201 of the actuating component 20 can push the hook 18 and separate the hook 18 from the second hole 143.

Figure 10:
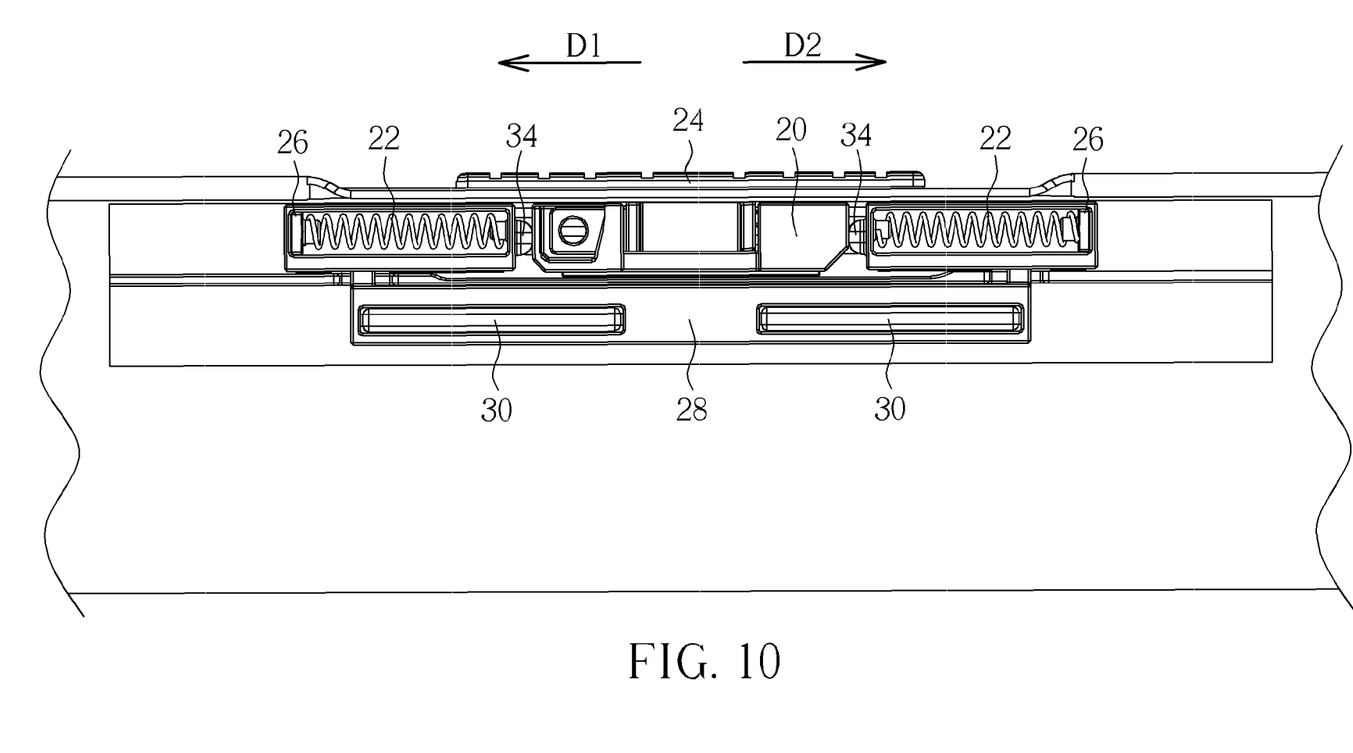
FIG. 10 and FIG. 11 are diagrams of the two-way latch mechanism in different operating modes with different views according to the embodiment of the present disclosure.
Figure 11:
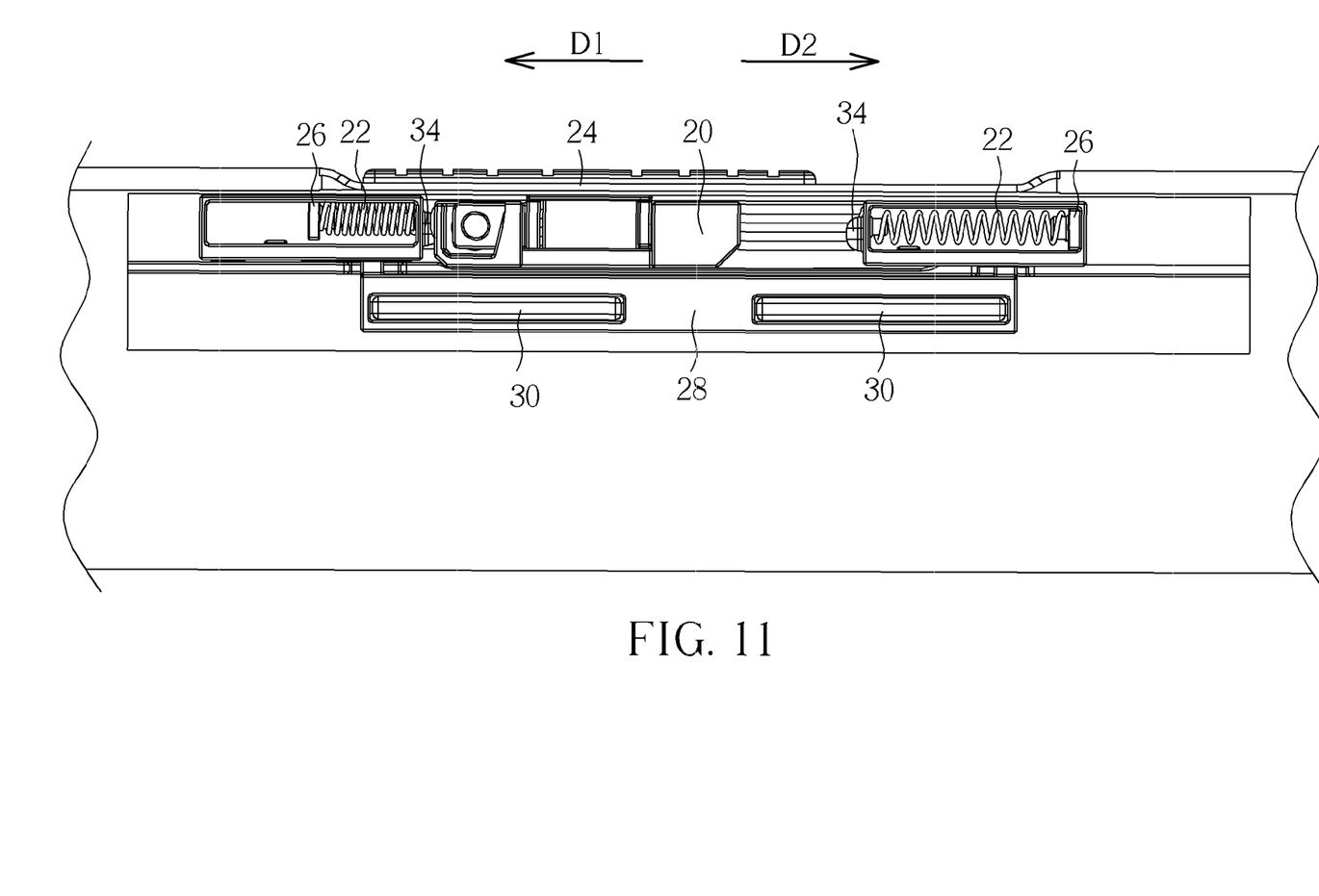

Please refer to FIG. 10 and FIG. 11. FIG. 10 and FIG. 11 are diagrams of the two-way latch mechanism 16 in different operating modes with different views according to the embodiment of the present disclosure. As show in FIG. 10, two resilient components 22 disposed on two ends of the actuating component 20 are respectively for setting the actuating component 20 at the initial middle position when the button 24 is not pushed. As shown in FIG. 11, when the button 24 drives the actuating component 20 to slide along the first direction D1 for separating the hook 18 from the first hole 141 or the second hole 143, which corresponds to the rotary angle of the panel 14 relative to the host 12, one of the positioning components 26 can slide relative to the constraining component 28 by the actuating component 20 (the other positioning component 26 is constrained by the protrusion 281 on the constraining component 28 and can not slide relative to the constraining component 28). Meanwhile, the resilient component 22 which the first direction D1 points (the one disposed on a left side of the actuating component 20) is compressed and stores a resilient recovering force. As a force applied on the button 24 is released, the resilient recovering force of the resilient component 22 is for sliding the actuating component 20 and the positioning component 26 along the second direction D2, so that the actuating component 20 can recover to the initial middle position by the two resilient components 22. Because the actuating component 20, the resilient component 22, the button 24, the positioning component 26 and the constraining component 28 of the two-way latch mechanism 16 are symmetric components, process of the two-way latch mechanism 16 for rotating the panel 14 relative to the host 12 at 180 degrees from the second portion to the first position are mentioned as above, and detailed description is omitted herein for simplicity.

Comparing to the prior art, the button of the two-way latch mechanism of the present disclosure is disposed on the panel. The two-way latch mechanism of the present disclosure has functions of dual directional lock, so that the panel can cover the host in two opposite directions. The two-way latch mechanism of the present disclosure can constrain relative pivot of the panel relative to the host. In addition, the button of the two-way latch mechanism of the present disclosure can keep at the middle position and is unable to move at an unexpected direction, so as to increase operational convenience.

Those skilled in the art will readily observe that numerous modifications and alterations of the device and method may be made while retaining the teachings of the disclosure.

What is claimed is:
1. A two-way latch mechanism comprising:
a hook pivotally disposed inside a host for engaging with a first hole on a panel when the panel is located at a first position relative to the host and for engaging with a second hole on the panel after the panel rotates at 180 degrees from the first portion to a second position relative to the host;
an actuating component slidably disposed inside the panel, two pushing portions being respectively formed on two sides of the actuating component, one of the pushing portions sliding at a first direction for separating the hook from the first hole when the panel is located at the first position relative to the host, and the other pushing portion sliding at the first direction for separating the hook from the second hole when the panel is located at the second position relative to the host;
two resilient components respectively disposed on two ends of the actuating component and installed inside the panel for providing resilient recovering force to the actuating component so as to hold the actuating component at a predetermined position;
two positioning components respectively slidably disposed on two ends of the actuating component and inside the panel, a sliding slot and a constraining slot being formed on each positioning component, and the constraining slot being connected to the sliding slot; and a constraining component slidably disposed inside the panel, two misaligning protrusions being formed on two ends of the constraining component, one of the protrusions being disposed inside the sliding slot on one of the positioning components, and the other protrusion being disposed inside the constraining slot on the other positioning component.

2. The two-way latch mechanism of claim 1, further comprising:
at least one protruding rib, the constraining component slidably sheathing on the protruding rib.

3. The two-way latch mechanism of claim 1, further comprising:
a magnetic component disposed inside the host for sliding the protrusions on the constraining component between the sliding slot and the constraining slot on the positioning component.

4. The two-way latch mechanism of claim 1, further comprising:
two buffers respectively disposed between the corresponding positioning component and the actuating component.

5. The two-way latch mechanism of claim 1, further comprising:
a plurality of ribs, the positioning component sliding relative to the plurality of ribs.

6. The two-way latch mechanism of claim 1, further comprising:
a first driving component connected to the hook for driving the hook into the host.

7. The two-way latch mechanism of claim 6, further comprising:
a second driving component disposed on the actuating component and located at a position corresponding to the hook for protruding the hook from the host when the panel is located at the first position and the second position relative to the host, so as to engage with the panel.

8. The two-way latch mechanism of claim 7, wherein the first driving component is a torsional spring, and the second driving component is a magnet.

9. The two-way latch mechanism of claim 1, further comprising:
a button connected to the actuating component.

10. An electronic device comprising:
a host;
a panel pivoted to the host, a first hole and a second hole being formed on the panel; and
a two-way latch mechanism for constraining relative movement between the host and the panel, the two-way latch mechanism comprising:
a hook pivotally disposed inside the host for engaging with the first hole on the panel when the panel is located at a first position relative to the host and for engaging with the second hole on the panel after the panel rotates at 180 degrees from the first portion to a second position relative to the host;
an actuating component slidably disposed inside the panel, two pushing portions being respectively formed on two sides of the actuating component, one of the pushing portions sliding at a first direction for separating the hook from the first hole when the panel is located at the first position relative to the host, and the other pushing portion sliding at the first direction for separating the hook from the second hole when the panel is located at the second position relative to the host;
two resilient components respectively disposed on two ends of the actuating component and installed inside the panel for providing resilient recovering force to the actuating component so as to stably hold the actuating component at a predetermined position;
two positioning components respectively slidably disposed on two ends of the actuating component and inside the panel, a sliding slot and a constraining slot being formed on each positioning component, and the constraining slot being connected to the sliding slot; and
a constraining component slidably disposed inside the panel, two misaligning protrusions being formed on two ends of the constraining component, one of the protrusions being disposed inside the sliding slot on one of the positioning components, and the other protrusion being disposed inside the constraining slot on the other positioning component.

11. The electronic device of claim 10, wherein the two-way latch mechanism further comprises:
at least one protruding rib, the constraining component slidably sheathing on the protruding rib.

12. The electronic device of claim 10, wherein the two-way latch mechanism further comprises:
a magnetic component disposed inside the host for sliding the protrusions on the constraining component between the sliding slot and the constraining slot on the positioning component.

13. The electronic device of claim 10, wherein the two-way latch mechanism further comprises:
two buffers respectively disposed between the corresponding positioning component and the actuating component.

14. The electronic device of claim 10, wherein the two-way latch mechanism further comprises:
a plurality of ribs, and the positioning component slides relative to the plurality of ribs.

15. The electronic device of claim 10, wherein the two-way latch mechanism further comprises:
a first driving component connected to the hook for driving the hook into the host.

16. The electronic device of claim 15, wherein the two-way latch mechanism further comprises:
a second driving component disposed on the actuating component and located at a position corresponding to the hook for protruding the hook from the host when the panel is located at the first position and the second position relative to the host, so as to engage with the panel.

17. The electronic device of claim 16, wherein the first driving component is a torsional spring, and the second driving component is a magnet.

18. The electronic device of claim 10, wherein the two-way latch mechanism further comprises:
a button connected to the actuating component.

* * * * *